United States Patent [19]

Prebay et al.

[11] Patent Number: 5,058,696
[45] Date of Patent: Oct. 22, 1991

[54] VARIABLE EFFORT AUTOMOTIVE POWER STEERING GEAR AND METHOD

[75] Inventors: Richard J. Prebay; John C. Whelton, both of Saginaw; David E. Witucki, Bay City, all of Mich.

[73] Assignee: General Motors Corporation, Detroit, Mich.

[21] Appl. No.: 608,922

[22] Filed: Nov. 5, 1990

[51] Int. Cl.$^5$ .............................................. B62D 5/083
[52] U.S. Cl. .................................. 180/141; 180/149; 74/388 PS; 91/375 R; 137/625.24
[58] Field of Search ............... 180/141, 143, 148, 149, 180/132; 74/388 RS; 91/375 A, 375 R; 137/625.21, 625.22, 625.23, 625.24

[56] References Cited

U.S. PATENT DOCUMENTS

| | | | |
|---|---|---|---|
| 2,939,429 | 6/1960 | Charlson | 121/41 |
| 3,998,131 | 12/1976 | Adams | 91/372 |
| 4,034,825 | 7/1977 | Adams | 180/143 |
| 4,759,420 | 6/1988 | Schipper Jr. et al. | 180/148 X |
| 4,809,806 | 3/1989 | Pietrzak et al. | 74/388 PSX |

Primary Examiner—Richard A. Bertsch
Assistant Examiner—Victor E. Johnson
Attorney, Agent, or Firm—Saul Schwartz

[57] ABSTRACT

A variable effort automotive power steering gear including an input or stub shaft, an output shaft or pinion head, a torsion bar between the stub shaft and pinion head defining an open-center position of one relative to the other, and detent reaction apparatus between the stub shaft and pinion head. The detent reaction apparatus includes a radial socket in a cylindrical wall of the pinion head, a detent groove in a stem of the stub shaft in the cylindrical wall, an insert rotatably supported in the radial socket with an eccentric bore offset from the centerline of the radial socket, and a detent element slidably supported in the eccentric bore in the insert and having a spherical end adapted to seat in the detent groove. The spherical end of the detent element is centered in the detent groove by rotating the insert until the detent element is at an innermost radial position. The adjusted position of the insert is captured by an in-situ injection molded plastic retainer on the pinion head which engages an exposed cavity on the insert.

12 Claims, 2 Drawing Sheets

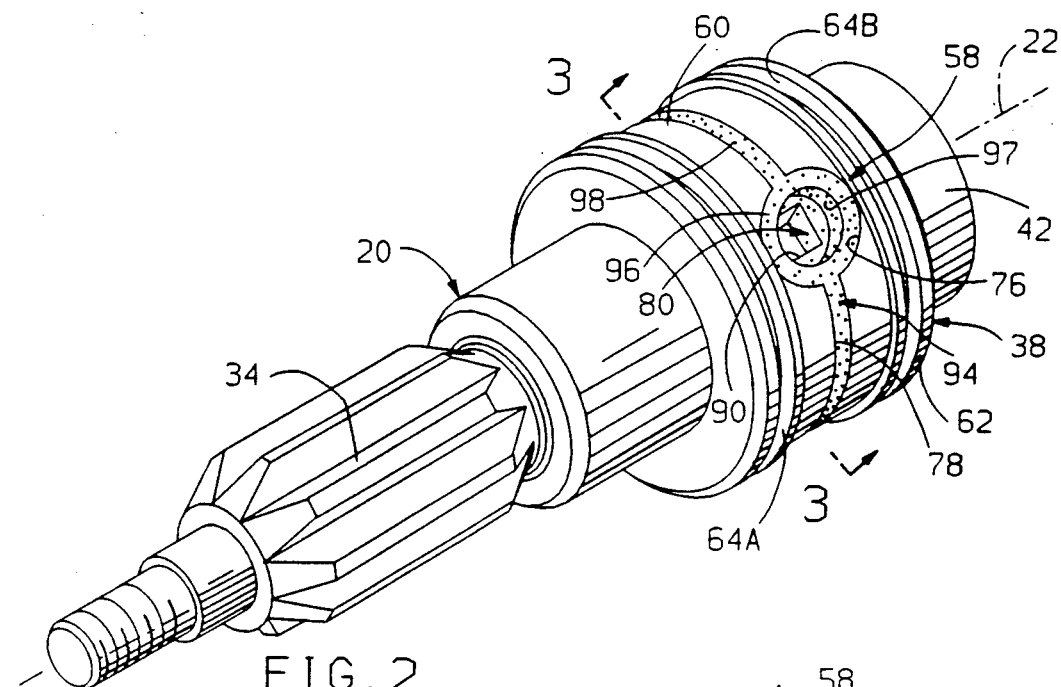
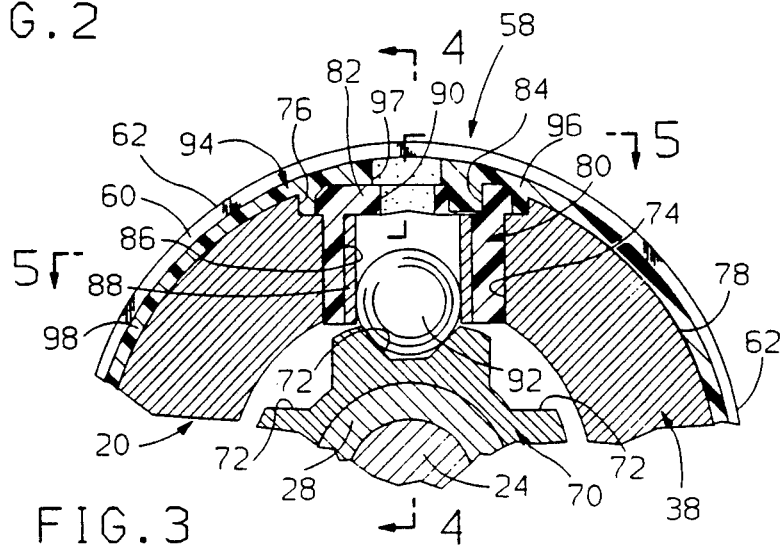
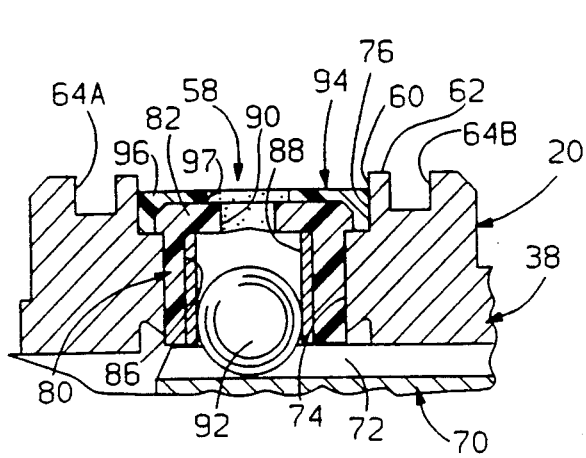
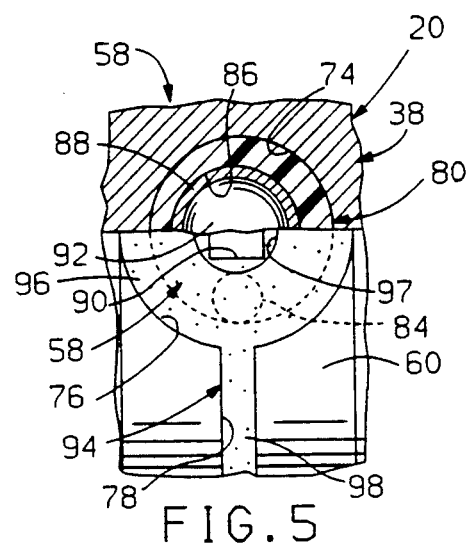

VARIABLE EFFORT AUTOMOTIVE POWER STEERING GEAR AND METHOD

FIELD OF THE INVENTION

This invention relates to variable effort power steering gears for automobiles.

BACKGROUND OF THE INVENTION

U.S. Pat. No. 4,759,420, issued July 26, 1988 to Schipper et al and assigned to the assignee of this invention, describes a detent reaction variable effort power steering gear for automobiles including an input or stub shaft, an output shaft or pinion head, and a torsion bar therebetween defining an open-center position of one relative to the other. A plurality of radial sockets in the pinion head receive screw-in inserts having eccentric bores. Spherical detent elements are slidably received in the eccentric bores and cooperate with detent grooves in the stub shaft to simulate additional torsion bar restoring force when fluid pressure is introduced into the eccentric bores above the detent elements. To center the detent elements in the detent grooves in the open-center position of the pinion head and stub shaft, the inserts are rotated relative to the pinion head to move the spherical ends of the detent elements relative to the detent grooves. When the detent elements are exactly centered, the inserts are staked for permanent retention. The apparatus and method according to this invention affords improved adjustment and retention of the inserts.

SUMMARY OF THE INVENTION

This invention is a new and improved detent reaction variable effort automotive power steering gear including an output shaft or pinion head having a tubular extension, an input or stub shaft having a stem in and concentric with the tubular extension of the pinion head, a plurality of radial sockets in the tubular extension of the pinion head, and a corresponding plurality of detent grooves in the stem aligned with the radial sockets. Each radial socket rotatably supports an insert having an eccentric bore therein. Each eccentric bore slidably supports a detent element having a spherical end seated in one of the detent grooves. The inserts are rotated in the sockets to center the detent elements in the detent grooves. After the detent elements are centered, a plastic retainer is injection molded in-situ, i.e. molded in place, in the radial sockets and in an annular groove on the pinion head interconnecting the radial sockets. The plastic retainer includes a plurality of buttons in the radial sockets which prevent rotation of the inserts relative to the retainer and an integral hoop in the annular groove which interconnects all the buttons and prevents both rotation of the buttons relative to the pinion head and radial dislodgment of the buttons and the inserts from the pinion head.

FIG. 2 is a fragmentary perspective view of a portion of FIG. 1;

FIG. 3 is an enlarged sectional view taken generally along the plane indicated by lines 3—3 in FIG. 2;

FIG. 4 is a sectional view taken generally along the plane indicated by lines 4—4 in FIG. 3; and FIG. 5 is a sectional view taken generally along the plane indicated by lines 5—5 in FIG. 3.

DESCRIPTION OF A PREFERRED EMBODIMENT

Figure 1:
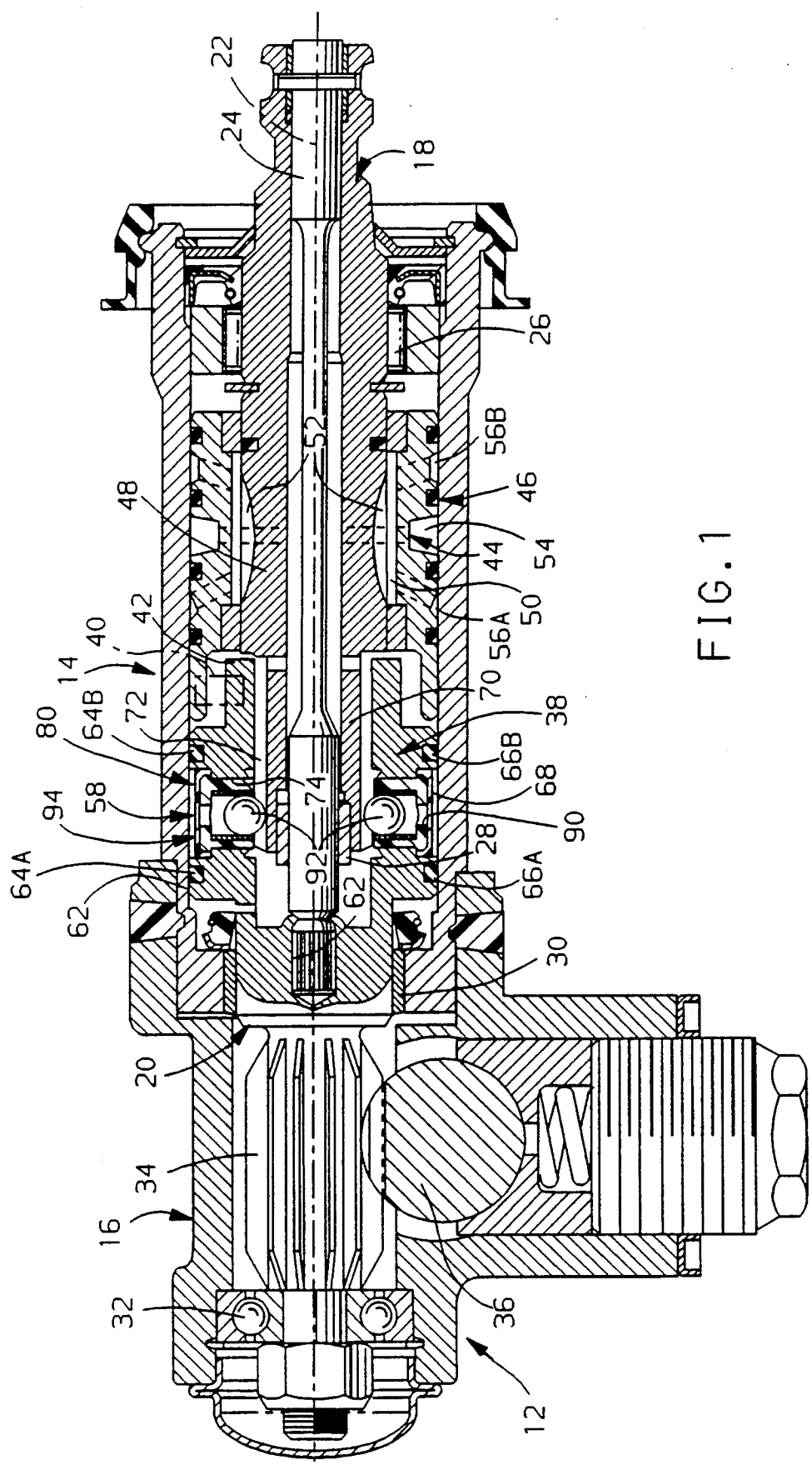
FIG. 1 is a longitudinal sectional view of a variable effort automotive power steering gear according to this invention.

Referring to FIG. 1, a detent reaction variable effort automobile power steering gear 10 according to this invention includes a composite housing 12 consisting of a cylindrical valve housing 14 and a rack and pinion housing 16. The steering gear 10 further includes a tubular input or stub shaft 18 adapted for connection to an automobile steering wheel and an output shaft or pinion head 20. The pinion head and stub shaft are aligned on a centerline 22 of the housing 12. A conventional torsion bar 24 in the stub shaft is connected at one end to the pinion head and at the other end to the stub shaft and defines an open-center position of the stub shaft relative to the pinion head, or vice versa, in the usual fashion.

The stub shaft is supported on the valve housing 14 for rotation about the centerline 22 by a needle bearing 26 and by a sleeve bearing 28 between the stub shaft and the torsion bar. The pinion head 20 is supported on the rack and pinion housing 16 for rotation about the centerline 22 by a sleeve bearing 30 and by a ball bearing 32 at the end of the pinion head. A pinion gear 34 on the pinion head 20 meshes with rack teeth on a steering rack 36 slidably supported on the rack and pinion housing 16 and adapted for connection to steered wheels of a vehicle. Rotation of the pinion head 20 about the centerline 22 is accompanied by bodily movement of the steering rack 36 in the usual fashion.

The pinion head 20 has a tubular extension 38 to the right of the pinion gear 34, FIG. 1, aligned on the centerline 22. A schematically illustrated pin 40 on a reduced diameter part 42 of the tubular extension projects radially out into a hole in a valve sleeve 44 of an open-center rotary control valve 46 of the steering gear 10 so that the valve sleeve rotates as a unit with the pinion head. The rotary control valve is generally as described in U.S. Pat. No. 3,022,772, issued to Zeigler et al and assigned to the assignee of this invention, and further includes a valve spool 48 defined by the portion of the stub shaft inside the valve sleeve 44. A plurality of grooves 50 in the valve sleeve face and cooperate with a plurality of slots 52 in the valve spool to distribute pressurized hydraulic oil from a center groove 54 on the sleeve 44 to one of a pair of side grooves 56A–B on the sleeve when there is relative rotation between the valve spool and the valve sleeve. The center groove 54 is connected to a pump, not shown, and the side grooves are connected to opposite sides of a steering assist fluid motor, not shown.

In conventional fashion, in the open center position of the stub shaft relative to the pinion head, the rotary valve is open-center and fluid circulates at low pressure from the pump to a reservoir, not shown. When a driver turns a steering wheel connected to the stub shaft 18, the stub shaft and valve spool rotate relative to the pinion head and valve sleeve against a restoring force developed by the torsion bar which the driver senses as road feel. Relative rotation between the valve sleeve and valve spool distributes pressurized hydraulic oil to the steering assist fluid motor as described. A detent reaction apparatus 58 is disposed between the stub shaft and pinion head to simulate additional restoring force and thereby afford the driver additional road feel.

The detent reaction apparatus 58 includes a wide annular groove 60, FIG. 2, on an outside diameter 62 of the pinion head tubular extension 38 and a pair of narrow annular grooves 64A-B on opposite sides of the wide groove Respective ones of a pair of seal rings 66A-B, FIG. 1, are disposed in the narrow grooves 64A-B and bear against the inside wall of the valve housing The seal rings, the valve housing 14 and the wide annular groove 60 define an annular detent pressure chamber 68, FIG. 1, around the pinion head. The detent pressure chamber is connected to a source, not shown, of fluid pressure which may vary with vehicle speed from minimum at low speed to maximum at highway speed.

The inboard end of the stub shaft 18 within the tubular extension 38 of the pinion head defines a stem 70 having thereon a plurality of angularly spaced, longitudinal, V-shaped detent grooves 72, FIGS. 3 and 4. A plurality of loosely mating spline teeth and grooves, not shown, on the tubular extension 38 and on the stem 70 define a positive driving connection between the stub shaft and pinion head at a predetermined maximum angular interval of relative rotation between the stub shaft and the pinion head.

As seen best in FIGS. 3-5, the detent reaction apparatus 58 further includes a plurality of radial sockets 74 in the tubular extension 38 nominally angularly aligned with respective ones of the detent grooves 72 in the open-center position of the stub shaft 18 relative to the pinion head 20. Each socket has a counterbore 76 at one end opening into the wide groove 60. In addition, an annular center groove 78 in pinion head in the middle of the wide groove 60 intersects each of the counterbores 76.

A plastic insert 80 is rotatably supported in each radial socket 74. Each insert has a head 82 with an annular shoulder which seats on the bottom of the corresponding counterbore 76 and an interlock means in the form of a cavity 84, FIG. 3, which opens toward the wide groove 60. Each insert also has a cylindrical bore 86 the centerline of which is eccentric or offset relative to the centerline of the corresponding radial socket 74. The eccentric bore 86 is lined with a steel sleeve 88 and is open at one end toward the stem 70 and closed at the other end by the head 82 except for a detent pressure port 90 generally in the center of the head. The detent pressure port 90 is square, FIGS. 2 and 5, for reception of an appropriate tool for rotating the insertion 80 in the radial socket 74. The port 90 may have any non-circular shape or it may be round and the head 82 of the insert may be formed to be gripped by a tool for rotating the insert.

Respective ones of a plurality of spherical steel detent elements 92 are slidably supported in each of the steel sleeves 88 in the inserts 80. The diameters of the detent elements correspond to the diameters of the steel sleeves so that an effective fluid seal is defined between the detent elements and the sleeves. The diameters of the detent elements 92 are further coordinated with the dimensions of the detent grooves 72 such that the spherical elements engage the converging sides of the detent grooves in point contact before engaging the bottom of the groove.

When the stub shaft 18 is in its open-center position relative to the pinion head 20, the detent elements 92 must likewise be centered in the detent grooves 72. Manufacturing tolerances, however, usually necessitate adjustment of the inserts 80 after the torsion bar 24 establishes the open-center position of the stub shaft relative to the pinion head. The detent elements are centered by rotating the inserts in the radial sockets 74 until the detent elements achieve innermost radial positions in the sleeves 88. For example, a combination depth sensing and turning apparatus, not shown, may be inserted in the detent pressure ports 90 of the inserts to grip the square sides of the ports and turn the inserts while at the same time monitoring the radial positions of the detent elements until a lowest position is achieved. The sliding fit between the radial sockets 74 and the inserts 80 is tight enough that the inserts hold their positions until permanently captured as described below.

After the detent elements are centered in the detent grooves, the pinion head 20 is placed in a mold of a plastic injection molding apparatus, not shown, for in-situ or in-place injection molding of a plastic retainer 94 which captures the adjusted positions of the inserts 80 and which prevents dislodgment of the inserts from the pinion head. It is contemplated that the depth sensing and turning apparatus suggested above could be incorporated in the plastic molding apparatus for manufacturing economy.

As seen best in FIGS. 2-5, the plastic retainer 94 includes a plurality of plastic buttons 96 which fill the counterbores 76 around the heads 82 of the inserts 80 to about flush with the bottom of the wide groove 60 in the pinion head. Each button is molded into the cavity 84 in the corresponding insert head 82 and completely around the head except outboard of the detent pressure port 90. During the molding operation, a mandrel extending radially into the counterbore 76 may cover the detent pressure port 90 to prevent migration of plastic into the insert 80. After the plastic cures, the portions of the buttons 96 in the cavities 84 mechanically interlock the buttons and the inserts 80 to capture the angular adjusted positions of the inserts relative to the buttons. In addition, when the mandrel is withdrawn after the plastic cures, a hole 97 is defined in each button outboard of the corresponding detent pressure port 90.

The plastic retainer further includes a plastic band or hoop 98, FIGS. 2, 3 and 5, which fills the annular center groove 78 generally to flush with the bottom of the wide annular groove 60 in the pinion head. The plastic hoop 98 is molded concurrently with the buttons 96 so that when the plastic cures the hoop is integral with each of the buttons. The hoop 98 completely encircles the pinion head 20 and prevents both rotation of the buttons 96 relative to the pinion head and radial dislodgment of the buttons and the inserts 80 from the pinion head.

In operation, fluid pressure in the detent pressure chamber 68 communicates with the detent elements 92 through the pressure ports 90 and the holes 97. As detent pressure increases, the detent elements are more forcefully pressed into the detent grooves 72. If detent pressure increases with increasing speed, the forces exerted by the detent elements simulate additional torsion bar restoring force which a driver, gripping a steering wheel connected to the stub shaft 18, senses as additional road feel at higher speed.

We claim:
1. In the manufacture of a variable effort automotive power steering gear including
  an output member having a cylindrical wall with a radial socket therein, an input member having a stem concentric with said cylindrical wall and a longitudinal detent groove in said stem aligned with said radial socket, and a detent element having a spherical end adapted for seating in said detent groove, a method of mounting said detent element on said output member comprising the steps of:

forming an insert having an interlock means thereon and a cylindrical eccentric bore therein, slidably mounting said detent element in said eccentric bore in said insert, rotatably mounting said insert in said radial socket in said output member with the centerline of said eccentric bore offset from the centerline of said radial socket, rotating said insert relative to said output member until said detent element therein achieves a radially innermost position corresponding to a centered position of said spherical end of said detent element in said detent groove, and in-situ injection molding a plastic retainer on said output member engageable with said interlock means to capture the angularly adjusted position of said insert relative to said output member.

2. The method of mounting said detent element on said output member recited in claim 1 wherein the step of forming an insert having an interlock means thereon and a cylindrical eccentric bore therein includes:

forming on said insert an exposed cavity for reception of in-situ injection molded plastic when said plastic retainer is in-situ injection molded on said output member.

3. The method of mounting said detent element on said output member recited in claim 1 wherein the step of forming an insert having an interlock means thereon and a cylindrical eccentric bore therein includes:

forming on said insert an exposed head having a non-circular shape for reception therearound of in-situ injection molded plastic when said plastic retainer is in-situ injection molded on said output member.

4. A method of manufacturing a pinion head for a variable effort rack and pinion power steering gear comprising the stems of:

forming on said pinion head a pinion gear aligned on a centerline of said pinion head, forming on said pinion head a cylindrical wall aligned on said centerline and a plurality of angularly spaced radial sockets in said cylindrical wall, forming in said cylindrical wall on said pinion head an annular groove interconnecting each of said radial sockets, forming a plurality of inserts each having an interlock means thereon and a cylindrical eccentric bore therein, rotatably mounting said plurality of inserts in respective ones of said radial sockets in said pinion head with the centerlines of said eccentric bores offset from the centerlines of the corresponding ones of said radial sockets, rotating said inserts relative to said output member until desired angular positions of said inserts relative to said pinion head are achieved, and in-situ injection molding a plastic retainer on said pinion head including a plurality of plastic buttons engageable with said interlock means on respective ones of said inserts and an integral plastic hoop in said annular groove interconnecting each of said plastic buttons.

5. The method of manufacturing a pinion head recited in claim 4 wherein the step of forming said plurality of inserts having an interlock means thereon and a cylindrical eccentric bore therein includes:

forming on each of said inserts an exposed cavity for reception of an integral portion of the corresponding one of said plastic buttons when said plastic retainer is in-situ injection molded on said output member.

6. The method of manufacturing a pinion head recited in claim 4 wherein the step of forming said plurality of inserts having an interlock means thereon and a cylindrical eccentric bore therein includes:

forming on each of said inserts an exposed head having a non-circular shape for reception therearound of the corresponding one of said plastic buttons when said plastic retainer is in-situ injection molded on said output member.

7. In a variable effort automotive power steering gear, the combination comprising:

an output member having a cylindrical wall with a radial socket therein, an input member having a stem concentric with said cylindrical wall and a longitudinal detent groove in said stem aligned with said radial socket, a detent element having a spherical end adapted for seating in said detent groove, an insert rotatably mounted in said radial socket and including an interlock means thereon and a cylindrical eccentric bore therein the centerline of which is offset from the centerline of said radial socket, means slidably mounting said detent element in said cylindrical eccentric bore, and an in-situ injection molded plastic retainer on said output member engageable with said interlock means to permanently capture the angular position of said insert relative to said output member.

8. The variable effort automotive power steering gear recited in claim 7 wherein said interlock means on said insert includes:

an exposed cavity for reception of in-situ injection molded plastic when said plastic retainer is in-situ injection molded on said output member.

9. The variable effort automotive power steering gear recited in claim 7 wherein said interlock means on said insert includes:

means defining on said insert an exposed head having a non-circular shape for reception therearound of in-situ injection molded plastic when said plastic retainer is in-situ injection molded on said output member.

10. A pinion head for a variable effort rack and pinion automotive power steering gear comprising:

means on said pinion head defining a pinion gear aligned on a centerline of said pinion head, means on said pinion head defining a cylindrical wall adjacent said pinion gear and aligned on said centerline, means on said pinion head defining a plurality of angularly spaced radial sockets in said cylindrical wall and an annular groove interconnecting each of said radial sockets, a plurality of inserts each having an interlock means thereon and a cylindrical eccentric bore therein, a plurality of detent elements slidably mounted in respective ones of said eccentric bores in said inserts, means rotatably mounting said inserts in respective ones of said radial sockets in said pinion head with the centerlines of said eccentric bores offset from the centerlines of the corresponding ones of said radial sockets, and an in-situ injection molded plastic retainer on said pinion head including a plurality of plastic buttons engageable with said interlock means on corresponding ones of said inserts and an integral plastic hoop in said annular groove interconnecting each of said plastic buttons.

11. The pinion head recited in claim 10 wherein said interlock means on each of said inserts includes:

means defining on each of said inserts an exposed cavity for reception of an integral portion of the corresponding one of said plastic buttons when said plastic retainer is in-situ injection molded on said pinion head.

12. The pinion head recited in claim 10 wherein said interlock means on each of said inserts includes:

means defining on each of said inserts an exposed heat having a non-circular shape for reception therearound of the corresponding one of said plastic buttons when said plastic retainer is in-situ injection molded on said pinion head.

* * * * *